July 16, 1940.    D. W. CHANDLER    2,208,358

FLAG HOLDER

Filed July 14, 1938

WITNESSES

INVENTOR
Digby W. Chandler
BY
ATTORNEYS

Patented July 16, 1940

2,208,358

UNITED STATES PATENT OFFICE 2,208,358

FLAG HOLDER

Digby W. Chandler, New York, N. Y., assignor to Annin & Co., New York, N. Y., a corporation of New York Application July 14, 1938, Serial No. 219,174

1 Claim. (Cl. 248—40)

This invention relates to flag holders and more particularly to a flag holder adapted to be used in connection with an automobile bumper or similar structure where a rectangular surface is available on which the holder may be fastened. A great number of flag holders adapted for use with automobile bumpers have been devised. Most of these are used in connection with the bumper itself. However, in view of the various types of bumpers and different shapes thereof, considerable difficulty has been met in securing a holder which would adapt itself to all makes, shapes and sizes of bumpers. Most of the prior attachments have been on the bumper itself with the result that the flag staff has been bent or broken when the bumper comes in contact with another object or when the bumper is run under a high object.

The object of this invention is to provide a flag holder which may be used on all types of bumpers and one which will position the staff away from the contact face of the bumper so that it will not be injured by being pressed against other surfaces.

A further object of the invention is to provide a flag holder which is readily adjustable for attachment to different sized members and which may be easily attached and removed.

Further objects and advantages of my invention will appear as the description proceeds.

In the accompanying drawing—

Figure 1:
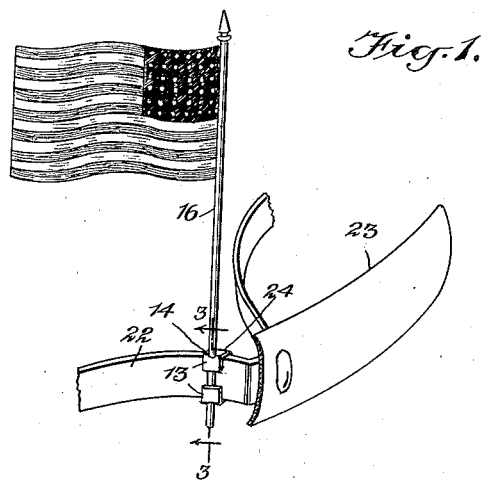
Fig. 1 is a perspective view of my invention attached to a conventional bumper spring, the bumper being broken away to illustrate the attachment.
Figure 2:
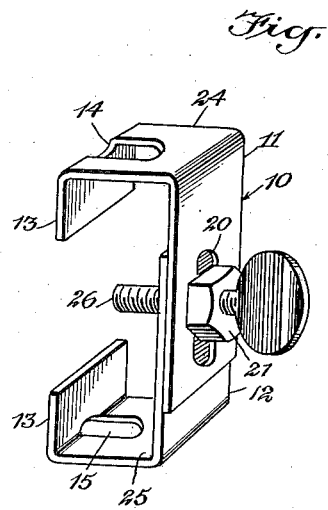
Fig. 2 is a perspective view of the clamp members and fastening means of my attachment.
Figure 3:
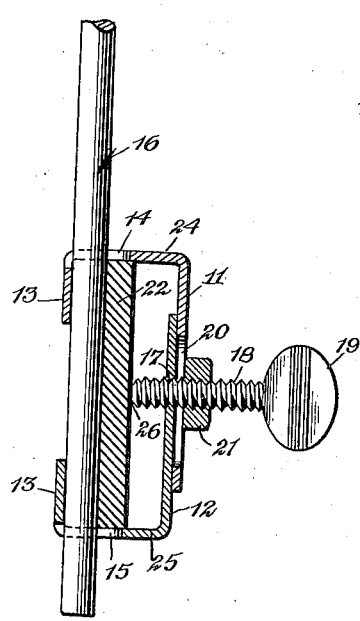
Fig. 3 is a cross-sectional view taken on the line 3—3 of Fig. 1.

Referring more particularly to the drawing, the numeral 10 indicates my attachment comprising two clamp members 11 and 12. The clamp members 11 and 12 may be formed of sheet iron, steel, or similar material and are generally J shaped in cross section, each of the members having a lip 13 for gripping purposes. The clamp member 11 has a slot 14 and the clamp member 12 a slot 15 for the reception of a flag staff 16. The slots 14 and 15 are so positioned in the clamp members 11 and 12 that they register one with the other. The slots 14 and 15 may be of any convenient size sufficiently large enough to hold a normal staff 16. The clamp member 12 is provided with an internally threaded hole 17 adapted to register with a screw 18. While in my drawing I have shown a thumb screw 19, it will be appreciated that any suitable type of screw may be substituted therefor. The clamp member 11 is provided with an elongated slot 20 through which the screw 18 operates. On the screw 18 is a lock nut 21 which while shown in the form of an ordinary nut might well be a wing nut for easier application. The lock nut 21 definitely positions the clamp members 11 and 12 with relation to each other. However, in actual use this nut may be omitted since the tension upon the lips 13 caused by the pressure of the thumb screw 19 will be sufficient to hold the members 11 and 12 in their respective positions.

In operation the device 10 may be fastened on a spring 22 of a bumper 23 or on any other suitable supporting member. The clamp members 11 and 12 are placed over the spring 22 and the staff 16 placed between the lips 13 and the spring 22. The members 11 and 12 are then collapsed by sliding them toward each other until the ends 24 and 25 thereof contact the edges of the spring 22 and the screw 18 is tightened until the end 26 thereof comes into contact and exerts pressure against the spring 22. The lock nut 21 is then screwed down to insure a tight connection between the members 11 and 12.

It will be noted that the staff 16 will be held rigidly in place in the slots 14 and 15 between the lips 13 and the spring member 22. Because of the particular construction described, the slots 14 and 15 may be of a greater size than is necessary to accommodate the staff 16 and yet the staff 16 will be held firmly in place due to the pressure of the lips 13 and the pressure exerted against the spring member 22 by the screw 18. Because of the slot 20, the clamp members 11 and 12 may be collapsed or expanded to accommodate spring members 22 of varying widths.

I claim:

A flag staff holding device for use with a supporting member comprising a pair of clamp members having inwardly extending lips, slots in each of said clamp members adjacent said lips and adapted to receive said flag staff, a screw threaded hole in one of said clamp members and a slot in the other of said clamp members, a screw passing through said slot and said screw threaded hole and adapted to press said supporting member in order to position said staff between said supporting member and said lips, and a lock nut on said screw adapted to position said clamp members with relation to each other.

DIGBY W. CHANDLER.